UNITED STATES PATENT OFFICE.

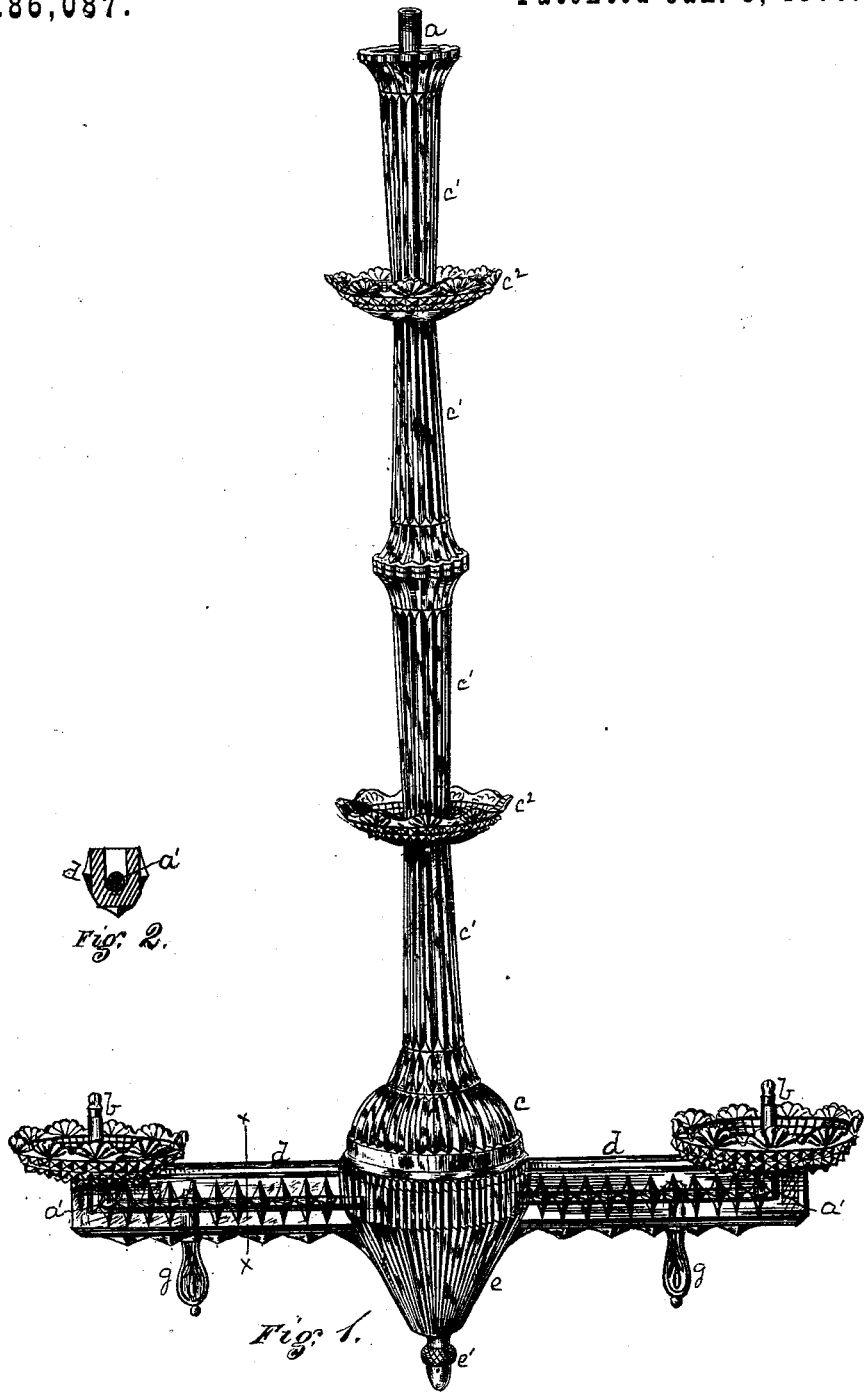

JOHN H. HOBBS, OF WHEELING, WEST VIRGINIA.

IMPROVEMENT IN CHANDELIERS.

Specification forming part of Letters Patent No. 186,087, dated January 9, 1877; application filed September 28, 1876.

*To all whom it may concern:*

Be it known that I, JOHN H. HOBBS, of Wheeling, county of Ohio, State of West Virginia, have invented or discovered a new and useful Improvement in Chandeliers; and I do hereby declare the following to be a full, clear, concise, and exact description thereof, reference being had to the accompanying drawing, making a part of this specification, in which— like letters indicating like parts—

Figure 1 is a perspective view of my improved chandelier, and Fig. 2 is a sectional view through $x\,x$ of Fig. 1.

My present invention relates to chandeliers having metallic stems and brackets covered with pressed-glass trimmings or cases. Glass chandeliers, prior to the making of the present invention, were made, so far as I am aware, wholly by hand, which is a slow, tedious, and costly mode of manufacture. By combining with metallic stems and metallic bracket-arms pressed-glass cases, coverings, or trimmings, I am enabled to produce an entirely new article of manufacture, and one which secures the finished and ornamental appearance of the hand-made article, at a greatly reduced cost.

In the drawing, $a$ represents the main stem of a gas-chandelier, consisting simply of gas-pipe. At the proper point the radial gas-pipe bracket-arms $a'$ project out, (one, two, or more,) and to these are attached the ordinary burners $b$. The bracket-arms may be straight or curved, at pleasure. On the vertical stem $a$ I slip a series of tubular casings, made of pressed glass by the use of suitably-shaped molds and plungers, such tubular casings being of any desired external shape, and having exteriorly any desired style of ornamentation; or they may be made plain. Preferably the lower section $c$ is made of the form of an inverted bowl. The sections $c^1 c^1$ consist of tubes, between which I arrange the ornamental pieces $c^2$ in such order as may be preferred. By the use of molds and plungers separately patented, I make for the bracket-arms $a'$ U-shaped or open-sided trimmings $d$, which I set onto the bracket-arms laterally, or from below, holes being made therein in the operation of pressing for the attachment of the cocks $g$. The counterpart $e$ of the piece $c$ is also pressed bowl-shaped, but with a hole punched through its lower end, through which a stem from the gas-pipe $a$ above projects, and onto which stem a nut, $e'$, is screwed to hold the lower half $e$ of the center piece in place; but other means of holding the glass trimmings in place may be adopted, if so preferred. The U-shaped parts $d$ are made to conform longitudinally to the shape of the pipe $a'$, and may be made of any desired pattern, such as are common in metallic trimmings, provided only that they be capable of lateral attachment to the pipes $a'$ as distinguished from being slipped over the ends of such pipes.

I apply the same improvement to coal-oil or other hydrocarbon chandeliers, a cup or other suitable support for the lamp-bowl being substituted for the gas-burner tip, and either solid or tubular metallic stems $a$ and arms $a'$ being used.

The tubular glass trimmings may be made up of semi-cylindrical or U-shaped pieces, or other open-sided work, put on laterally from opposite sides of the stem $a$, so as to form practically a surrounding trimming, and there secured in any convenient way. The trimmings for the lateral arms $a'$ may also be made in sections, and may follow in design any of the known metallic or other like trimmings, capable of lateral attachment to the bracket-arms.

The tubular sections may also be applied to the stems of pillar-lights, such as are used on counters, tables, and newel-posts. A like effect and result may be secured by the use of porcelain-glass.

I make no claim herein to the bracket-trimmings described, by themselves considered, nor to the lower part of the center piece, they being separately patented.

I am aware that it has been proposed to string glass beads onto gas-pipe for ornamental purposes; but as such beads are known in the art to be simply a hand-made article, and, being hand-made, are too costly to be practicable, or to work any practical improvement in the art of making chandeliers, I do not consider them as anticipatory of my invention of pressed-glass tubular casings having a considerable length as compared with their diameter, and such beads are hereby disclaimed.

What I claim herein as my invention is—

1. In the construction of chandeliers and pillar-lights, the pressed-glass tubular cases $c^1 c^1$, having each a considerable length as compared with its diameter, in combination with the vertical stem $a$ of the light, substantially as set forth.

2. The pressed-glass tubular sections $c^1 c^1$ and ornamental pieces $c^2$, arranged on the vertical stem $a$, substantially as set forth.

In testimony whereof I have hereunto set my hand.

JOHN H. HOBBS.

Witnesses:
BEN. M. HILDRETH,
LUCIEN B. MARTIN.